United States Patent [19]

Barnes

[11] 4,096,391

[45] Jun. 20, 1978

[54] METHOD AND APPARATUS FOR REDUCTION OF SCATTER IN DIAGNOSTIC RADIOLOGY

[75] Inventor: Gary T. Barnes, Birmingham, Ala.

[73] Assignee: The Board of Trustees of the University of Alabama, Birmingham, Ala.

[21] Appl. No.: 801,808

[22] Filed: May 31, 1977

Related U.S. Application Data

[63] Continuation-in-part of Ser. No. 732,858, Oct. 15, 1976, abandoned, which is a continuation of Ser. No. 591,701, Jun. 30, 1975, abandoned.

[51] Int. Cl.$^2$ .............................................. G01N 23/00

[52] U.S. Cl. .................................... 250/505; 250/320; 250/445 T

[58] Field of Search ............... 250/444, 446, 320, 505, 250/445 T, 491, 511

[56] References Cited

U.S. PATENT DOCUMENTS

| | | | |
|---|---|---|---|
| 1,768,769 | 7/1930 | Kelley | 250/444 |
| 3,783,282 | 1/1974 | Hoppenstein | 250/446 |
| 3,866,047 | 2/1975 | Hannsfield | 250/445 T |
| 3,944,833 | 3/1976 | Hannsfield | 250/445 T |

*Primary Examiner*—Alfred E. Smith
*Assistant Examiner*—B. C. Anderson
*Attorney, Agent, or Firm*—Oblon, Fisher, Spivak, McClelland & Maier

[57] ABSTRACT

A method and apparatus are disclosed for reducing scatter in diagnostic radiology and thereby improving image clarity and resolution, particularly in mammography or where abdominal organs are being studied. The method includes the use of a scanning multiple slit arrangement in conjunction with a conventional X-ray generator and imaging modality. A first or upper plate having a plurality of slits is placed between the patient to be X-rayed and the focal spot of an X-ray tube. A second or lower plate having corresponding number of slits, but substantially expanded in scale relative to the first plate, is placed beneath the patient but above the photographic cassette on which the X-ray image is to be recorded. The lower plate may consist of a bifurcated plate structure or a single, thick, slotted plate. The upper and lower slit structures are coupled together and are mechanically driven by a suitable drive mechanism to rapidly scan the patient with a group of separate beams produced by the upper slit plate. The upper and lower slits are maintained in registration with one another so that primary radiation transmitted by the upper slits is also transmitted by the lower slits while scattered radiation from the patient is blocked by the lower plate structure.

22 Claims, 9 Drawing Figures

METHOD AND APPARATUS FOR REDUCTION OF SCATTER IN DIAGNOSTIC RADIOLOGY

CROSS-REFERENCE TO RELATED APPLICATIONS

This is a continuation-in-part application of application Ser. No. 732,858, filed Oct. 15, 1976 (now abandoned), which application was a continuation of application Ser. No. 591,701, filed June 30, 1975 (now abandoned).

BACKGROUND OF THE INVENTION

1. Field of the Invention

The present invention relates generally to the field of diagnostic radiology, and more particularly to a method and apparatus for the reduction of scatter in diagnostic radiology.

2. Description of the Prior Art

The contrast-reducing effect of scattered X-rays was recognized in the early days of radiography and led to the invention of the Bucky grid and its numerous improvements. The conventional Bucky grid consists of an array of lead foil strips which are separated by strips of radiolucent spacing material. The array is positioned between the object and image receptor so that the image-forming X-rays from the focal spot see only the edges of the foils strips and the majority pass through the radiolucent spacers. A significant portion (typically 30 – 45%), however, of the image-forming X-rays are attentuated by the lead strips. Scattered X-rays are emitted on the other hand from the patient in all directions and the majority of these that are emitted towards the image receptor do not have a straight line path through the radiolucent spacers to the image receptor and are therefore absorbed (typically 85 – 95%) in the lead.

The effect of the Bucky grid is to improve the quality of the X-ray image by attenuating scattered radiation to prevent it from reducing the image contrast. Although devices of this type are effective in improving image contrast, it remains poor in areas, such as the abdomen, where a higher degree of scattering exists. For example, even with the best Bucky grids, one obtains roughly only 53% of the primary beam contrast in normal X-rays of the abdomen. This low contrast level produces images of rather poor quality making accurate diagnosis of ailments based on these X-ray images extremely difficult.

Efforts have been made to improve image contrast through various techniques such as the use of air gaps, improved electronics and certain forms of scanning techniques. However, known techniques have generally proved to be unsatisfactory in obtaining high image qualities while maintaining rapid scanning rates and low exposure times. While it is possible to obtain high contrast images of good quality with very slow scanning speeds, as with a single scanning beam for example, such low speed scanning techniques are not practical in diagnostic radiology in view of the fact that body parts and organs move while patients are being X-rayed. Thus if relatively long exposure times are required to obtain X-ray images, the images are blurred to the extent of being useless for diagnosis due to the movements of the organs and body parts being X-rayed.

A need therefore exists for a practical method and apparatus and improving image contrast through scatter reduction in diagnostic radiology. To be truly practical, such a method and apparatus should be capable of use with existing equipment in view of the fact that any improvement which would require complete replacement of existing X-ray facilities simply for providing improved image quality would be expensive to an impractical degree, particularly in the current economic climate.

SUMMARY OF THE INVENTION

Accordingly, one object of the present invention is the provision of a novel apparatus for reducing scatter in diagnostic radiology.

Another object of the present invention is the provision of a novel method for reducing the effect of scattered radiation on images produced for use in diagnostic radiology.

Yet another object of the present invention is the provision of a novel scanning multiple slit apparatus for use in reducing the effect of scattered radiation in diagnostic radiology.

A still further object of the present invention is the provision of a novel scanning multiple slit arrangement for use in improving image contrast in scanning radiology.

Yet another object of the present invention is to provide a scanning multiple slit arrangement which is easily adaptable to existing X-ray equipment for greatly improving the contrast and clarity of X-ray images.

Yet another object of this invention is to reduce the exposure to the patient if the device is designed to provide only the image contrast now available with conventional equipment.

A still further object of the present invention is the provision of a novel method of using a scanning multiple slit structure with existing X-ray equipment for improving image quality and contrast.

Briefly, these and other objects of the present invention are achieved by the use of a pair of scanning slitted plates in conjunction with existing X-ray equipment. A first plate of relatively small size and having a series of thin slits is positioned between a patient to be X-rayed and an X-ray tube. A larger plate with an identical number of slits is placed beneath the person to be X-rayed and above the film cassette or other modality which records the X-ray image. It is to be noted that the slits in the bottom plate are really slots that is, having a width which is small compared to the depth. Alternatively a bifurcated plate structure can be used in place of a thick, slotted bottom plate. The scanning plates are coupled together and are moved in unison to scan a plurality of thin X-ray beams across the patient. The combined slits act to substantially reduce the amount of scattered X-rays incident on the image receptor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
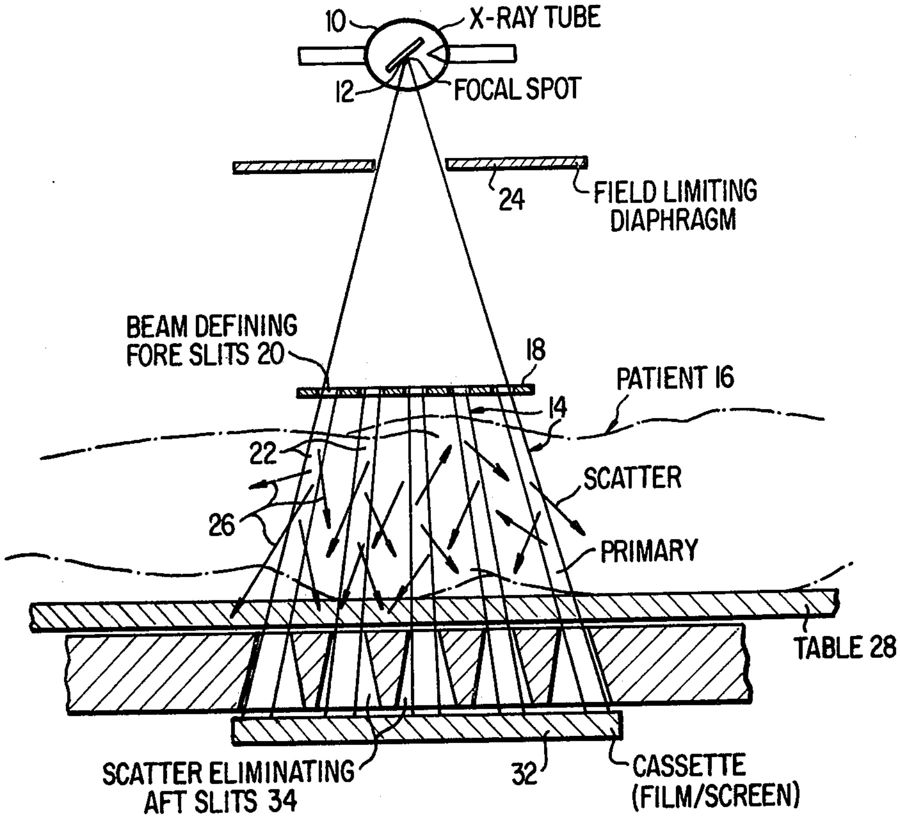
FIG. 1 is a schematic illustration of the two slit arrangement of the present invention.

Referring now to the drawings, wherein like reference numerals designate identical or corresponding parts throughout the several views, and more particularly to FIG. 1 thereof, the scanning multiple slit method and apparatus of the present invention are illustrated in schematic form. In FIG. 1 a conventional X-ray tube 10 having a focal spot as indicated at 12 projects a continuous X-ray beam 14 in the direction of a patient 16. As is well known to those skilled in the art, conventional X-ray tubes have a focal spot size of 2.0 millimeters or less, e.g., 0.3 millimeter. It will be understood that the object being X-rayed will be referred to as a patient in this application in view of the fact that the present invention is viewed as being most beneficial in diagnostic radiology, although it will be understood by those skilled in the art that the present invention may be used in radiographic studies of many different types of animate and inanimate objects in addition to human medical patients.

According to the invention, a fore slit plate 18 is positioned in the path of the X-ray beam 14 at a position above the patient 16. The fore slit plate is formed of a material such as lead or steel which is generally opaque to X-rays, but includes a plurality of narrow slits 20 which permit the passage of a group of narrow parallel beam segments 22 for scanning the patient 16. The slits 20 should have a minimum dimension of at least two times the focal spot size of the conventional X-ray tube 10 to provide optimum results. A conventional field limiting diaphragm 24 is positioned above or below the fore slit plate 18 and the patient to limit the total area of irradiation in accordance with conventional practice.

Upon striking the patient 16, the narrow beam segments are partially defused or scattered as indicated by a plurality of arrows 26 pointing in a number of arbitrary directions. These scattered beam portions carry no significant information, and thus tend to blur or reduce the contrast in any resulting X-ray image. On the other hand, portions of the beam segments 22 penetrate directly through the patient 16, and it is these penetrating beam portions, known as primary radiation, which carry the information as to the structural configuration of the patient's internal organs. In this regard it is pointed out that the abdomen is the most difficult portion of the body to X-ray accurately in view of its relatively dense concentration of organs, bones and body fluids. In the crowded abdominal area extremely clear, high quality X-ray images are necessary to obtain the degree of detail required to permit accurate diagnosis of disease or detection of tumors and other improper growths. However, the thickness, the dense concentration of material in the abdomen and the large radiation field necessary to image the abdominal area creates a large amount of X-ray scattering, thus making it most difficult to obtain clear radiographic images of the abdomen, as mentioned above. Accordingly, it is highly desirable and important to the advancement of abdominal diagnostic radiography that clearer X-ray images of this area of the body be obtained.

Referring again to FIG. 1, the patient is shown supported by a table 28 which is constructed of a relatively light, X-ray transparent material. Beneath the table 28 is an aft slit plate 30 which is positioned above a conventional X-ray film cassette 32. The aft slit plate 30 includes a plurality of slots 34 whose width is small compared to their depth and which are significantly wider than the slits 20 in the fore slit plate 18 so that they are of sufficient width to accommodate the expanded beam segments 22 which penetrate the patient 16. The slots 34 preferably have depth to width ratio of at least four to one. Both the fore and the aft slit plates include an identical number of slits and are essentially congruent, although the aft slit plate is substantially expended in scale relative to the fore slit plate. Comparative dimensions of the two slit plates will be set forth subsequently.

In operation, the two slit plates 18 and 30 are moved in synchronism to effectively cause a scanning of the patient 16 by the various beam segments 22. In this manner the X-ray film in the cassette 32 is scanned by the beam segments penetrating the patient 22, resulting in a clear image which does not include any shadows or evidence of the existence of the two slit plates. More importantly the use of the two slit plates results in a very effective attentuation of virtually all scattered radiation so that the image on the X-ray film has a significantly improved contrast and clarity relative to images taken without the combined slit plate structure of the present invention.

Figure 2:
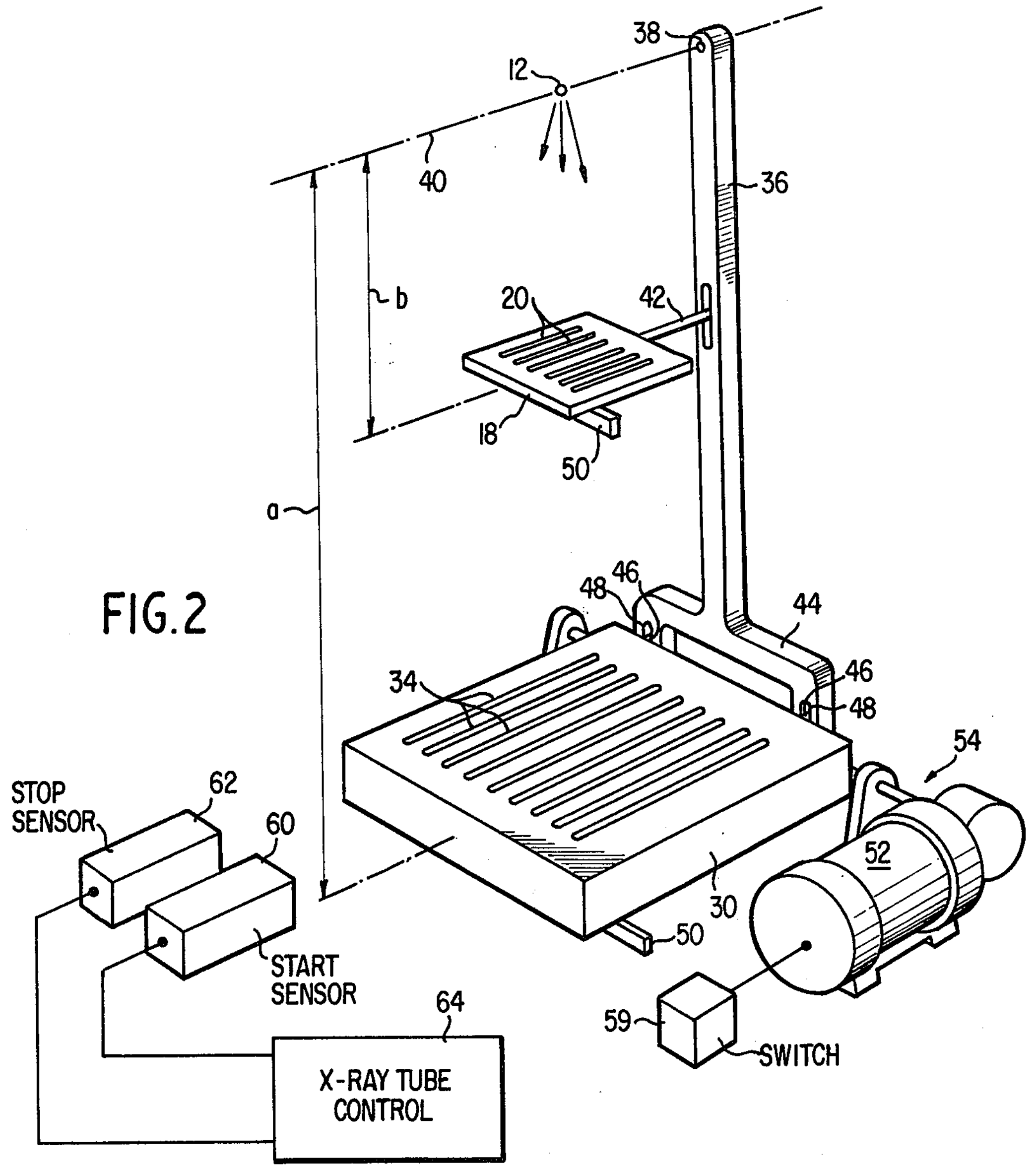
FIG. 2 is a perspective illustration of one embodiment of the structure of the present invention.

Attention is now directed to FIG. 2 which is a perspective illustration of one embodiment of the structure of the present invention. The structure illustrated in FIG. 2 includes a rigid arm 36 pivoted at a point 38 about an axis 40 which passes through the focal spot 12 of X-ray tube 10. The fore slit plate 18 is shown rigidly mounted to the support arm 36 by means of a mounting member 42 which may be formed integral with the support arm 36. The aft slit plate 30 is coupled to a base portion 44 of the support arm 36 by means of a pair of pegs 46 which fit into a pair of corresponding slots 48 formed in the base 44. The slots 48 are vertically elongated so that the support arm 36 may move in an arcuate path while the lower slit plate 30 moves in a linear manner.

Linear motion of the lower slit plate 30 is assured by a linear guide 50, to which the slit plate 30 is coupled by means of conventional roller bearings or other suitable coupling means which permit free linear motion with a minimum of friction. A conventional electric motor 52 drives the support arm and slit plate assembly through a conventional worm gear drive 54, as shown in greater detail in FIG. 3. The worm gear drive includes a worm gear 56 driven by the motor 52 and engaging a gear segment 58 secured to the lower slit plate 30. The worm gear drive and electric motor assembly are entirely conventional and do not in themselves comprise any aspect of the present invention. The worm gear and electric drive assembly are suitable for use with the present invention in view of the fact that the worm gear arrangement permits precision motion while electric power is normally conventionally available to energize the motor. However, many other types of drives and power sources, including hydraulic and belt arrangements can be used to power the apparatus of the present invention. Different types of drives can easily be adapted to the described structure in view of the present teachings by those skilled in the art.

In the embodiment of FIG. 2, a switch 59 is provided for energizing the motor 52. When energized, the motor 52 drives the support arm 36 through the coupling pegs 46 in the base 44 and the worm gear drive 54, causing both slit plates to move. A start sensor 60, which may be a conventional limit switch, a photocell device, or any similar type of conventional device, is provided to detect movement of the aft slit plate. The start sensor 60 is coupled to an X-ray tube control 64, which is in turn coupled to the X-ray tube 10, for energizing the tube when the start sensor 60 is triggered. A conventional stop sensor 62, which may be identical to the start sensor 60, is also coupled to the X-ray tube control 64 for shutting off the tube 10 after the slit plate assembly has moved sufficiently far to complete its scanning movement.

Figure 4:
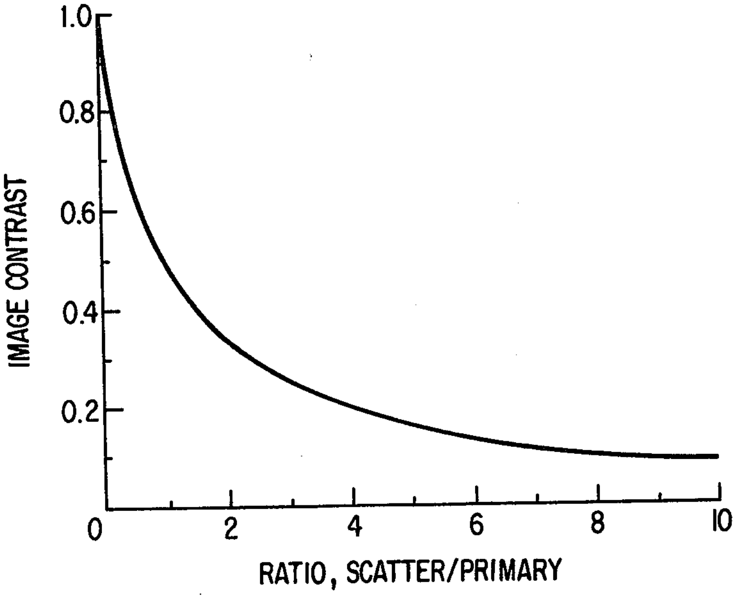
FIG. 4 is a graphical illustration of the fractional decrease in radiographic contrast due to scatter.

The specific slit design and geometrical parameters of the present invention are of great significance in minimizing the effect of scattered irradiation on X-ray photographs. One significant parameter used in determining the preferred slit width and other dimensions of the present invention is the amount of scattered radiation present in the beam emerging from a given patient relative to the amount of primary or information bearing radiation. This parameter, known as the scatter-to-primary ratio (abbreviated S/P), varies from about 2, in the case of chest radiography, to roughly 9 in abdominal radiography. The curve in FIG. 4 illustrates the relationship between radiographic image contrast (vertical axis) and S/P ratio (horizontal axis). As shown, when there is no scattered radiation the image contrast is at a maximum, but the image contrast drops rapidly with increasing S/P ratio until the S/P ratio reaches approximately 4, after which the image contrast begins to level out somewhat. However, at an S/P ratio of 4, the image contrast has dropped from 1.0 to 0.2, a five fold reduction in contrast. Thus it is clear that reduction of the S/P ratio is highly important in improving image contrast.

Because of patient motion occurring during long exposure times and its resulting degradation of image quality, it is also important to maintain a short exposure time. In order to do this, the X-ray beam must irradiate the largest area of film possible while keeping scatter at a minimum. This may be accomplished by irradiating a volume of tissue with the largest total surface area for a given irradiated film area. Comparing a long narrow rectangular field and a circular radiation field of the same irradiated film area incident upon the same thickness, the volume irradiated is the same, so that the number of scattering interactions that occur is the same in either case. However since the total surface area of the long narrow rectangular radiation field is substantially larger, the scatter produced in the larger total surface area/volume geometry has a much higher probability of being scattered out of the volume and not being incident on the film. Thus a series of long rectangular beams is preferable to a single large beam in terms of scatter reduction. Furthermore, a series of spaced rectangular beams of this type scanned across the patient area provides the shortest exposure time for a given S/P ratio. These considerations led to the rectangular slit arrangement of the present invention.

The length of the slits 34 in the aft slit plate 30 are preferably selected to correspond to the dimensions of conventionally used X-ray film, which is generally 14 by 17 inches (35.6 by 43 cm) or smaller. Thus the length of the aft slits 34 is preferably 17 inches (or 43 cm). Other typical dimensions for the apparatus illustrated in FIG. 2 are set forth in attached Table 1. The dimensions in Table 1 are critical but have a useful range. Typical values for construction of the apparatus of the present invention are given. Each dimension represents essentially a central point in an acceptable range of dimensional values.

Tables 2, 3 and 4 below represent, respectively, measured values for S/P ratios of a single fore slit as a function of slit width, scatter distribution for a single fore slit as a function of the distance from the edge of the aft slit and fractional incidence of scatter transmitted through neighboring slits versus distance from an irradiated slit. Thus the values set forth in these tables represent the dependencies of the apparatus of the present invention on various parameters with regard to its susceptability to receiving scattered radiation. Using the calculated values from Tables 2, 3 and 4 in conjunction with the dimensions selected from Table 1, the total S/P ratio of the apparatus of the present invention may be calculated as shown in Table 5.

TABLE 1

TYPICAL DIMENSIONS FOR SMSA (FIG. 2)

| | Fore Slit | Aft Slit |
|---|---|---|
| Distance From X-Ray Tube Focal Spot (cm) | 30.0 | 96.0 |
| Slit Width (cm) | 0.156 | 0.5 |
| Slit Depth (cm) | 0.06 | 3.0 |
| Slit Length (cm) | 13.49 | 43.0 |
| Slit Separation (cm) | 0.625 | 2.0 |
| Number of Slits | 18 - 20 | 18 - 20 |
| Scanning Velocity (cm/sec) | 3.125 - 15.625 | 10 - 50 |

TABLE 6

TYPICAL DIMENSIONS FOR SMSA (FIG. 9)

| | Fore Slit | Upper Aft Slit | Lower Aft Slit |
|---|---|---|---|
| Distance From X-Ray Tube Focal Spot (cm) | 48.8 | 117.0 | 120.0 |
| Slit Width (cm) | 0.163 | 0.39 | 0.40 |
| Slit Depth *(cm) | 0.06 | 0.06 | 0.06 |
| Slit Length (cm) | 17.5 | 42.1 | 43.2 |
| Slit Separation (cm) | 0.65 | 1.56 | 1.60 |
| Number of Slits | 39 | 39 | 39 |
| Scanning Velocity (cm/sec) | 3.25 - 8.13 | 7.8 - 19.5 | 8 - 20 |

*Note the separation distance between the upper and lower aft slit plates is 3cm

TABLE 2

SCATTER/PRIMARY FOR A SINGLE FORE SLIT VERSUS SLIT WIDTH*

| Slit Width**(cm) | Scatter/Primary |
|---|---|
| 0.10 | 0.04 |
| 0.25 | 0.10 |
| 0.50 | 0.19 |
| 0.75 | 0.29 |
| 1.00 | 0.39 |
| 1.50 | 0.58 |
| 2.00 | 0.77 |

*8"lucite phantom at 80 kV

**Slit width measured in image plane

TABLE 3

| SCATTER DISTRIBUTION FOR A SINGLE FORE SLIT* | |
|---|---|
| Distance From Edge of Aft Slit (cm) | Scatter |
| 0 | 1.00 |
| 1 | .92 |
| 2 | .79 |
| 3 | .69 |
| 4 | .62 |
| 5 | .53 |
| 6 | .45 |
| 7 | .39 |
| 8 | .33 |
| 9 | .28 |
| 10 | .23 |

*Measured in aft slit plane with 8" lucite phantom at 80 kV
NOTE:
Distribution is independent of slit width for slits varying from 0.38 cm to 3 cm.

TABLE 4

| Fraction Of Incident Scatter Transmitted Through Neighboring Slit Versus Distance From Irradiated Slit* | |
|---|---|
| Fraction of Incident Scatter Transmitted | Separation Distance (cm) |
| 0.105 | 1 |
| 0.095 | 2 |
| 0.070 | 4.5 |
| 0.045 | 7 |
| 0.020 | 9.5 |

*Measured for 0.4 cm aft slit having a 3 cm thickness with 8" lucite phantom at 80 kV

TABLE 5

CALCULATION OF SCATTER/PRIMARY FOR SMSA WITH 0.5 CM AFT SLIT SEPARATED BY 2 CM (DEPTH OF AFT SLIT 3 CM)

TOTAL SCATTER/PRIMARY RATIO

| | | |
|---|---|---|
| s/p for single slit | s/p (Table 2) | = 0.19 |
| + [scatter contamination from nearest neighbors — 2 cm | [2 × (scatter at edge) × distance factor [× fraction transmitted = 2 × 0.19 × 0.72 × 0.095 | = 0.026 |
| + [scatter contamination from next nearest neighbors — 4.5 cm | + [2 × 0.19 × 0.57 × 0.070 | = 0.015 |
| + [scatter contamination from 3rd nearest neighbors — 7.0 cm | + [2 × 0.19 × 0.36 × 0.045 | = 0.006 |
| | TOTAL | = 0.24 |

Scatter Degradation Factor $= \frac{1}{1 + \frac{s}{p}} = \frac{1}{1.24}$ 0.81

NOTE:
For a typical grid having 0.4 grams of lead per cm$^2$.
The degradation of contrast due to scatter is 0.50.
Thus, the improvement in contrast is approximately 1.6.

As shown in these calculations, the scatter degradation factor is approximately 0.81 for the present invention, as opposed to 0.50 for conventional apparatuses. Thus the present invention is capable of providing a 60 percent improvement in output image contrast. This highly significant improvement in image contrast in view of the relatively simple nature of the apparatus of the present invention is believed to be highly significant in providing a practical, low cost technique for improving quality of diagnostic X-ray images, particularly of the abdominal area. As a result, much greater accuracy and reliability in diagnosing abdominal diseases is anticipated.

As mentioned above, exposure time is an important factor in obtaining clear X-ray images since involuntary movements of organs and the like can cause unacceptable image blurring if exposures are carried out over long intervals. In general for abdominal examinations the exposure time should be limited to approximately ½ second. The present invention easily permits short scanning intervals of ½ second or less.

Having described in detail the structure of the present invention, its method of operation will now be summarized. A patient is first placed in an appropriate position on the X-ray table. The apparatus of the present invention is then started by switching on the motor 52. The start sensor 60 activates the X-ray tube control 64 to turn on the X-ray tube when motion of the aft slit plate is detected. The stop sensor 62 is subsequently activated by motion of the aft slit plate, whereupon the X-ray tube is shut off by the X-ray tube control 64. The aft slit plate must move a minimum distance equal to the width of one slit plus the width of one slit separation, that is, a total distance of at least 2.5 cm. using the parameters of Table 1. Preferably, the slit plate moves two or three times this distance (at least 5 cm) to assure a complete and uniform scanning of the patient. It is noted that at the minimum scanning speed set forth in Table 1 (10 cm per second) a 5 cm scan would be accomplished in ½ second, the proper maximum exposure time for abdominal X-rays as mentioned above. Movement of the fore slit is, of course, tied to the aft slit, and is proportional to the speed of the aft slit in accordance with the ratio of the distance of both slits from the pivot point 38.

Figure 3:
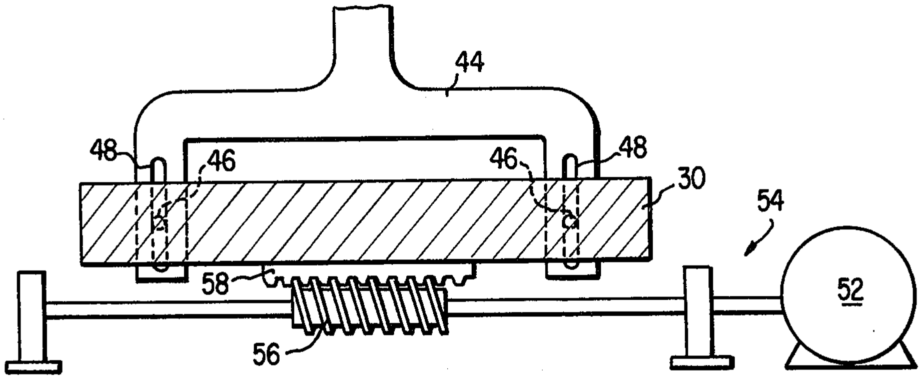
FIG. 3 is a detailed description of the drive assembly illustrated in FIG. 2.

In the embodiment of the invention illustrated in FIGS. 1–3 the lower or aft slit plate 30 has been described as a relatively thick plate having slots 34 whose width is small compared with their depth. The slots 34 preferably have at least one side which is angled to make the slot wider at the bottom than the top so that primary X-ray radiation passes through the slot even when the slit plate is scanned furthest toward the left. This situation is explained in more detail in FIGS. 5 and 6.

Figure 5:
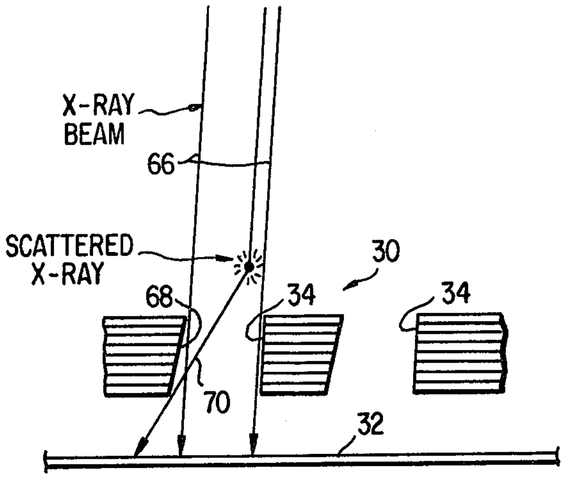
FIG. 5 is a diagram illustrating the passage of X-rays through a slot in the lower slit plate 30 when the slit plate is in its starting position.
Figure 6:
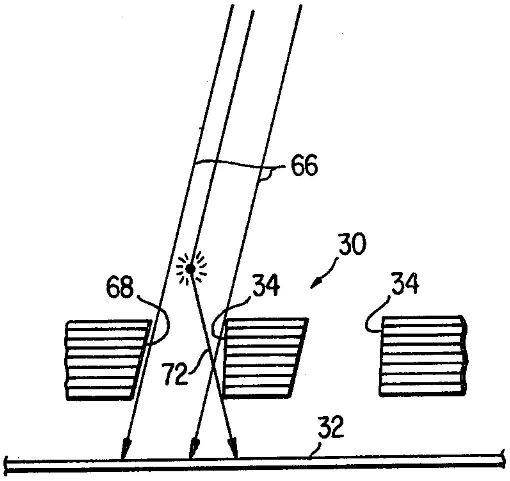
FIG. 6 is a diagram similar to FIG. 5 wherein the lower slit plate is moved toward the left illustrating the passage of X-rays through the plate when in this position.

FIG. 5 illustrates the aft slit plate 30 in its initial position. A primary radiation beam segment 66 is shown passing through a slot 34 in the slit plate 30. The left side 68 of the slot 34 is shown tapered outwardly so that the slot 34 is slightly wider at the bottom than at the top. The purpose of this inclined wall structure is illustrated in FIG. 6. In that figure the slit plate 30 is shown after it is scanned to the left. In this position the X-ray beam segment 66 is oriented at a greater angle with respect to the plane of the slit plate 30, and accordingly the beam segment is now parallel to the angled wall 68. Thus it is apparent that the wall is angled to permit the entire beam segment 66 to pass through the slit plate 30 when the slit plate is in its left most position.

However, the angular configuration of the wall 68 causes the lower portion of each slit to be wider than the upper portion. This allows additional scattered radiation, illustrated by the rays 70 and 72 in FIGS. 5 and 6, respectively, to reach the film cassette. As has been explained previously, this scattered radiation degrades the quality of the X-ray image recorded on the film cassette.

Figure 7:
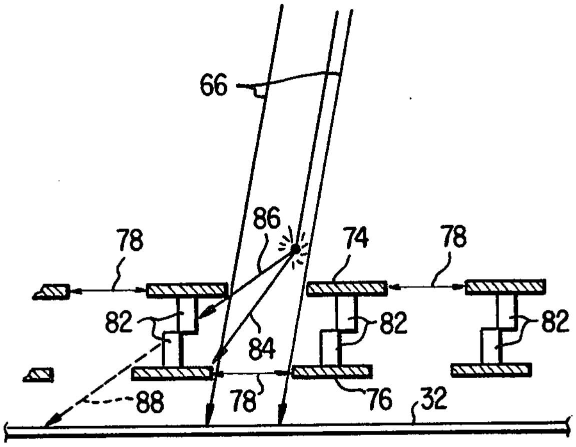
FIG. 7 is an illustration similar to FIG. 5 illustrating the passage of X-rays through a bifurcated slit plate structure.
Figure 8:
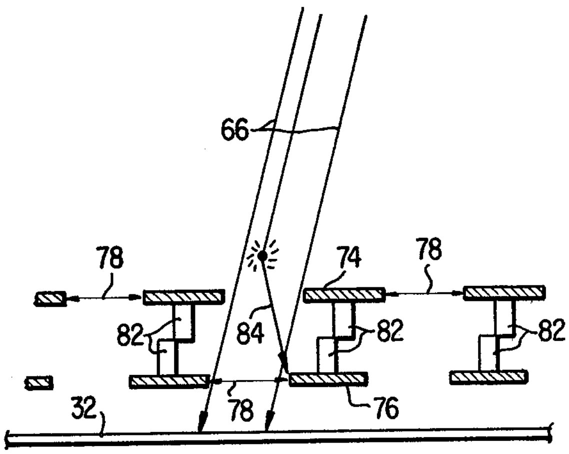
FIG. 8 is a diagram similar to FIG. 6 illustrating the passage of X-rays through the bifurcated plate structure of FIG. 7 when moved to the left; and, FIG. 9 is a more detailed illustration of the drive mechanism for the bifurcated plate structure illustrated in FIGS. 7 and 8.
Figure 9:
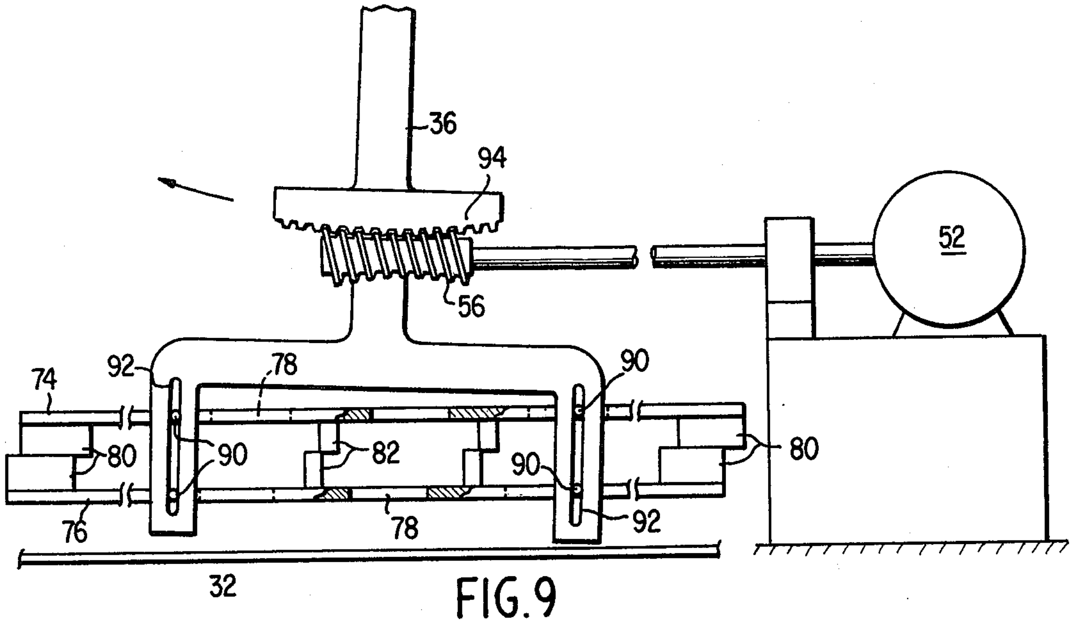

To eliminate the probelm of this additional scatter, an improved bifurcated lower scanning slit structure is illustrated in FIGS. 7–9. Referring particularly to FIG. 9, the bifurcated slit structure is shown as including an upper slit plate portion 74 and a lower slit plate portion 76. Both portions include pluralities of identical slits 78 which serve the same function as the slot 34 in the previously described single plate structure. The size relationship of the slits 78 relative to the slits in the upper plate 18 are substantially unchanged relative to the preceeding disclosure, although it should be noted that the width of slits and separation distance between slits is slightly smaller in the upper slit plate than in the lower slit plate due to the fact the distance between slit plates is large compared to the slit width and the divergence of the X-ray beam.

The separation between the plates is made large relative to the width of the slits 78, so that the two plates 74 and 76 taken together appear to the X-ray source as a single thick plate. The plates are preferably made of a high density and high atomic number radiopaque metal, such as lead, tungsten or tantalum, or a combination of these materials. attached at each ènd to the upper surface of the lower plate 76 and a similar spacer is attached to the lower surface at each end of the upper plate 74 and the spacers are positioned so that the two plates can slide relative to one another. Similarly, scatter blocking ribs 82 fabricated of, or cadded with, a radiopaque metal are positioned on opposite sides of each of the slits 78. These ribs have a height which is equal to approximately ½ the distance between the two plates so that the upper and lower ribs together form a substantially continuous radiation shield separating each pair of upper and lower slots 78 formed adjacent pairs of slots. It is not necessary that the upper and lower ribs actually touch, and the slit plates may be supported on the ball bushings.

The effect of the bifurcated structure illustrated in FIG. 9 is shown more clearly in FIGS. 7 and 8. Referring particularly to FIG. 7, the primary beam segment 66 is shown passing through a pair of upper and lower aft slits 78. Radiation having a small scatter angle is illustrated by the arrow 84. This radiation is effectively blocked by the lower slit plate portion 76. Other radiation with a high scatter angle is illustrated by the arrow 86. This radiation is effectively blocked by the scatter blocking ribs 82. If the ribs were not in place, the high scatter angle radiation would pass through the adjacent slot 78, as shown by the dash arrow 88 and would degrade the image on the cassette 32.

FIG. 8 illustrated a further advantage of the bifurcated structure. As the slits are scanned to the left, the support arm 36 (shown in FIG. 9) travels in a slightly arcuate path so that the lower slit plate portion 76 is moved slightly farther than the upper slit plate portion 74. It is noted that these two slit plate portions are coupled to the support arm 36 by means of a plurality of pegs 90 positioned in elongated slots 92 in arms at opposite ends of the base 44 of the support arm 36. The bifurcated structure of the lower slit plate assembly enables the lower slit plate portion 76 to slide slightly relative to the upper slit plate portion 74. As shown in FIG. 8 this creates an effective angular slot which is fully aligned with the angled primary beam portion 66. Thus the complete beam portion is permitted to pass through the modified total slot and this is achieved without widening the lower portion of the slot as is the case in the previously described embodiment of the invention illustrated in FIGS. 5 and 6. Accordingly the embodiment of the invention illustrated in FIGS. 7–9 improves image contrast by further reducing the amount of scattered radiation impinging on the film cassette 32.

Referring again to FIG. 9, it is noted that the drive assembly is modified slightly to further reflect the arcuate movement of the support arm 36. In particular, a slightly arcuate gear segment 94 is coupled directly to the support arm and is driven by the worm gear 56 coupled to motor 52. Typical dimensions of the embodiment shown in FIG. 9 are provided in Table 6.

Although the illustrated apparatus is shown as scanning along the patient supporting table, it will be apparent to those skilled in the art that the apparatus works equally well if scanning is conducted across the table.

Additional slight improvements in image contrast could be obtained by increasing the depth of the aft slots, by increasing the separation between slits, by having narrower slits or by having a greater number of narrower slits spaced closer together.

The apparatus could also be produced using a multiplicity of square, rectangular, circular or other geometrically shaped apertures in place of the elongated slits as shown. That is, each slit, in effect, would be replaced by a multiplicity of squares, rectangles, circles or other geometrical shapes and the neighboring multiplicity of apertures would be shifted in such a manner that when the assembly is scanned across the patient a uniform radiation exposure to the film would result. However, an apparatus of this type requires greater precision in manufacturing, since registration among the apertures is required in two dimensions. An additional improvement in image contrast, however, is possible with such devices as compared to the slit-type apparatus disclosed above.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of improving image contrast in diagnostic radiology comprising the steps of:

producing an X-ray beam using a conventional X-ray source having a focal spot of a predetermined size, creating a plurality of regularly arranged beam segments, each having a minimum dimension at least two times greater than said focal spot size; and, scanning said beam segments in unison across an object to be irradiated, for producing X-ray images of improved contrast.

2. A method as in claim 1, further comprising the steps of:

positioning an X-ray image recording means beneath said object for producing an image of radiation penetrating said object; and, masking radiation emerging from said object prior to its impingement on said X-ray image recording means using a masking member having X-ray transparent portions with minimum dimensions at least two times greater than said focal spot size.

3. A method as in claim 2, wherein said step of masking radiation emerging from said object includes the step of:

scanning a masking member in synchronism with said scanning of said beam segments.

4. A method as in claim 3, further comprising the steps of:

automatically controlling said X-ray tube in response to both said steps of scanning, which are carried out in synchronism.

5. An apparatus for enhancing the contrast of radiographic images comprising:

radiation source means for producing a radiation beam and having a focal spot of a predetermined size, first masking means positioned in the path of said radiation beam for dividing said beam into a plurality of segments for irradiating an object, said first masking means including X-ray transparent portions having minimum dimensions at least two times greater than the size of said focal spot, imaging means positioned in the path of radiation penetrating said object for forming an image thereof; and, second masking means positioned between said object and said imaging means in the path of radiation penetrating said object for reducing the extent to which radiation scattered by said object reaches said imaging means whereby the contrast in images produced by said imaging means is significantly enhanced, said second masking means having X-ray transparent portions of larger minimum dimensions than those of said first masking means and having a ratio of depth to width of at least four to one.

6. An apparatus as in claim 5, wherein:

said first masking means includes a plate formed of a material which is opaque with respect to said radiation beam, said plate having a plurality of regularly spaced radiation transparent portions for transmitting said plurality of beam segments.

7. An apparatus as in claim 6, wherein:

said second masking means is similar in shape to said first masking means but uniformly larger in size.

8. An apparatus as in claim 7, wherein:

said radiation transparent portions are elongated slits.

9. An apparatus as in claim 7, wherein:

said first and second masking means are mechanically coupled together for uniform motion.

10. An apparatus as in claim 5, further comprising:

drive means coupled to at least one of said masking means for scanning said plurality of beam segments across said object.

11. An apparatus as in claim 10, further comprising:

linking means coupling said first and second masking means and said drive means for scanning said first and second masking means in synchronism.

12. An apparatus as in claim 10, further comprising:

control means coupled to said radiation source means and to said drive means for controlling operation of said radiation source means in response to movement of at least one of said masking means.

13. An apparatus as in claim 12, wherein:

said control means includes a pair of detectors for starting and stopping said radiation source means as said first and second masking means scan across said object.

14. A method as in claim 1, wherein:

said step of creating includes the step of producing a plurality of beam segments each having a minimum dimension at the image receptor not less than 1 millimeter.

15. A method as in claim 1, wherein:

said step of creating includes the step of producing a plurality of beam segments each having a minimum dimension at the image receptor of between 1 and 10 millimeters.

16. An apparatus as in claim 5, wherein;

said first masking means includes X-ray transparent portions having minimum dimensions at the image receptor not less than one millimeter.

17. An apparatus as in claim 5, wherein;

said second masking means includes X-ray opaque portions separating each X-ray transparent portion.

18. An apparatus as in claim 5, wherein;

said second masking means includes first and second slit plates spaced from one another and movable with respect to one another.

19. An apparatus as in claim 18, wherein:

said first and second slit plates include slits which are in registration with one another, and further including scatter blocking ribs positioned to prevent highly scattered radiation from passing laterally from one slit to another.

20. An apparatus as in claim 18, further comprising:

means coupled to said first and second slit plates for blocking radiation having a large scatter angle.

21. An apparatus as in claim 20, wherein:

said first and second slit plates each include pluralities of slits having selected widths in registration with one another; and said first and second slit plates are spaced apart by a distance which is large relative to said slit widths.

22. An apparatus as in claim 20, wherein:

said first and second slit plates are at least partially formed of a radiopaque metal.

* * * * *